April 22, 1941.  C. L. STOKES  2,239,122
POWER OPERATED VEHICLE
Filed May 28, 1938  2 Sheets-Sheet 1
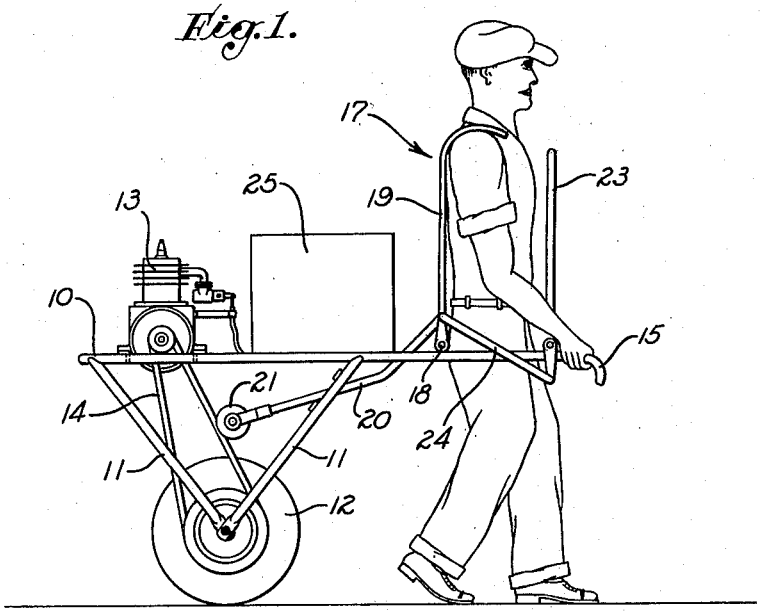
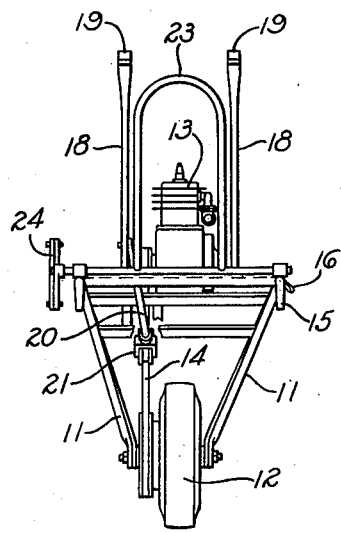
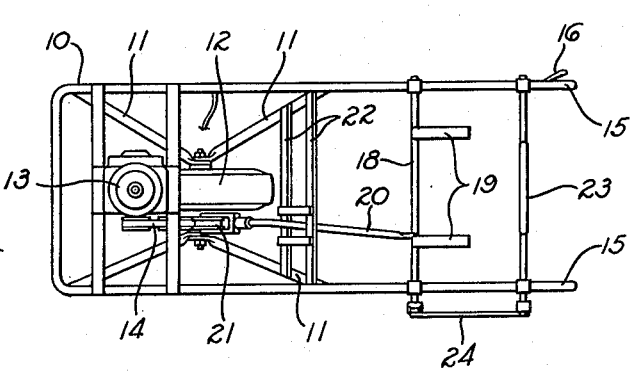
INVENTOR
Charles L. Stokes April 22, 1941.	C. L. STOKES	2,239,122
POWER OPERATED VEHICLE
Filed May 28, 1938	2 Sheets-Sheet 2

INVENTOR
Charles L. Stokes

Patented Apr. 22, 1941

2,239,122

UNITED STATES PATENT OFFICE 2,239,122

POWER OPERATED VEHICLE

Charles L. Stokes, Santa Monica, Calif.

Application May 28, 1938, Serial No. 210,652

5 Claims. (Cl. 180—19)

This invention relates to power operated vehicles and has for its principal object the provision of mechanism in which the continuous operation of the vehicle is dependent upon the inertia of the operator.

The invention is applicable to any form of moving carrier in which the inertia of the operator replaces wholly or in part the manual control of clutch mechanisms for causing mechanism to become operable, or move.

As a particular application, the invention is illustrated and described with respect to a wheelbarrow type of carrier in which the operator walks without effort while being propelled by the mechanism, at the same time being enabled to move a considerable dead weight load, but the invention is not limited in any way by the following illustration as it may be obviously used in many ways.

In the drawings,

Fig. 1 is an elevation of mechanism embodying the invention in one of its simplest forms;

Fig. 2 is a plan view of Fig. 1;

Fig. 3 is a front view of Fig. 1;

Figure 4:
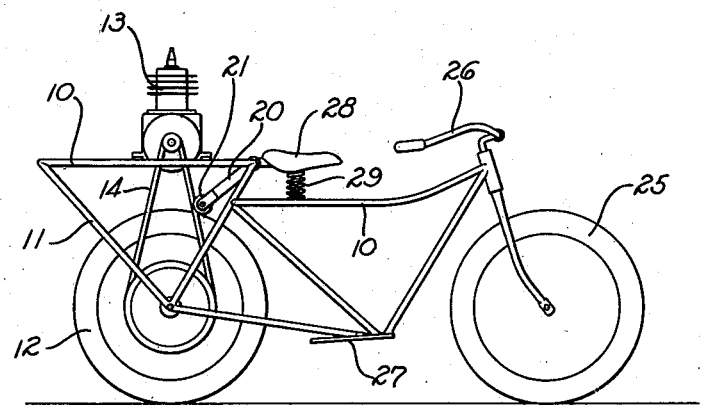
Fig. 4 is a side view of a modification.

The mechanism comprises a frame 10 having downwardly projecting struts 11 adapted to be supported by a power wheel 12.

At a desired position on frame 10 there is mounted an engine 13, the crankshaft of which is connected through suitable drive mechanism, such as belt 14, with the wheel 12, any desired gear reduction being thus included.

Frame 10 terminates forwardly in a pair of guide handles 15, to one of which is contiguous the usual manual control handle 16 for controlling the speed of engine 13 which is somewhat diagrammatically illustrated as an internal combustion engine with the usual accessories.

Intermediate handles 15 and engine 13 is a control member 17 comprising a rod 18 pivoted at each end on frame 10 and a pair of support members 19 connected to rod 18 and having curved ends adapted to pass over the shoulders of the operator for carrying any excess of load balanced on frame 10.

To control member 17 there is pivoted a clutch mechanism comprising a bar 20 on the end of which is mounted a pulley 21 adapted to coact with drive belt 14, bar 20 being suitably guided, or aligned, by cross members 22, or in any suitable or well known manner.

Intermediate handles 15 and control member 17 is a secondary control member comprising a curved bar 23 pivotally fastened to frame 10 and connected below frame 10 by a linkage 24 pivotally connected to control member 17.

A box, or other load carrying member, 25 may be mounted on frame 10 at a convenient place.

The operation of the device is as follows, the invention being shown as applied in its simplest form to enable one skilled in the art to utilize the same:

The weight of engine 13 and any load in box 25 is preferably arranged to be balanced so that when the frame 10 is raised to its normal horizontal working position, as illustrated, there will be a minimum load to be supported by the operator through members 19 or supported by his hands through handles 15.

Engine 13 is started, and the operator places himself in operating position between control members 17 and 23 and raises frame 10 to its horizontal position.

At this time with engine 13 rotating at a relatively low speed, drive belt 14 is so arranged as to slip and exert no driving power on wheel 12 so long as the operator exerts no pressure on either of the control members 17 or 23, and the position of such members when belt 14 is thus slipping is preferably slightly forward of vertical.

When desiring to advance, the operator will then simply lean back slightly sufficient to cause pulley 21 to act as a clutch mechanism and take up the slack in drive belt 14 whereupon the whole mechanism will advance at the same time propelling the operator forwardly.

This action provides the continued forward propulsion of the load and operator without substantial effort on the part of the latter beyond balancing and guiding the mechanism, and such will continue as long as the operator permits himself to simply lean back without applying any force restricting forward motion. Upon moving slightly forward, the clutch mechanism is disengaged, and the mechanism stops.

When getting into difficult operating ground, such as extremely steep slopes, sand, etc., wherein the power of a small motor is insufficient to accomplish the double duty of propelling the load and operator, the operator can simply lean forward against the secondary control member 23 to effect similar clutch engagements, as described, and at the same time pull on handles 15, or frame 10, to aid the engine in overcoming extreme conditions.

In this manner, an operator in carrying loads is enabled to a vastly increased amount of work by covering greatly increased distances during a day with substantially no effort beyond walking.

It is obvious that the invention may be applied to the front or back of an advancing mechanism with equal effect, and that, while the simplest form of clutch mechanism and reducing gear is shown, the invention is not limited thereto but comprehends the use of any form of drive gear and clutch mechanisms provided the same is made operative by the inertia of the operator.

The invention is applicable to multi-wheel vehicles and is useful as a power wheelbarrow, velocipedes, and other mechanisms for business or pleasure, or for use in army equipment. With a single power wheel, or dual wheels closely coupled, it is clear that the mechanism can travel practically anywhere along a trail where the operator can walk with substantially no effort on the part of the operator except walking. On an open paved road the operator may even avoid walking by applying roller skates to his feet, or ice skates on frozen surfaces.

As to velocipedes, such as bicycles, motorcycles, and the like, similar principles may be utilized.

Figure 5:
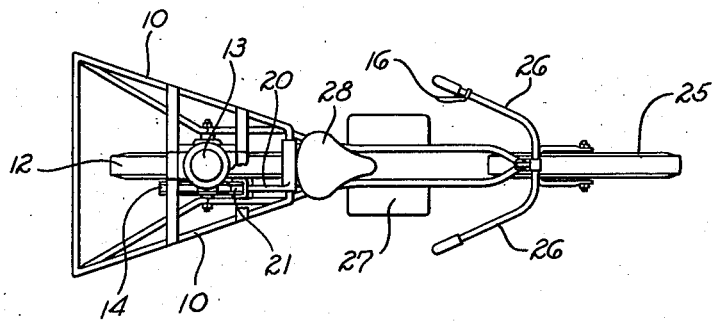
Fig. 5 is a plan view of Fig. 4.

Referring to Figs. 4 and 5, it will be seen that frame 10a may not only carry the engine 13 with space for an auxiliary load, but generally comprises any well known construction of frame including a front steering wheel 25 with handle bars 26 and foot rests 27.

In this event, however, the clutch mechanism, including bar 20 and pulley 21, is firmly fixed to the saddle 28 cushioned by spring 29 on a suitable portion of frame 10 so that the inertia of the operator when seated engages the clutch mechanism for forward motion.

This may be accomplished in similar manner to that described by way of the operator simply straddling saddle 28 without exerting any weight thereon until ready to advance.

Upon starting engine 13 with belt 14 slipping as described, the operator seats himself on saddle 28, which is thereby depressed a predetermined distance depending on the adjusted tension of spring 29, to the end that pulley 21 will be raised to effect tension on belt 14 and thus advance the vehicle, whereupon the operator will withdraw his feet from the ground and put them on foot rests 27 and guide and control the vehicle in the usual way by handle bars 26 and associated control mechanism.

In stopping, the operator will slow down and stop the vehicle by friction of his feet on the ground or by other means (not shown).

The use of the invention does not preclude, but on the contrary may include, the use of any well known devices such as mechanical brakes, change speed mechanisms, and the like such as are commonly known and utilized in motor vehicles.

The invention in its broadest sense is adapted to the operation of any mechanism in which the primary driving means is controlled by the inertia of the operator.

I claim as my invention:

1. Power operated mechanism comprising: a frame terminating at one end in a pair of handles, means connected with said frame for driving the same, an engine on the frame, drive mechanism connecting the engine and driving means, a clutch mechanism coacting with said drive mechanism, and means pivotally connected to said frame intermediate said handles and engine adapted to make said clutch mechanism operative to move said frame; said clutch operating means including a pair of bars pivotally connected to each other and spaced longitudinally in said frame to permit the operator to stand in between so that upon rearward movement of the rear bar and forward movement of the front bar from a predetermined position said clutch mechanism becomes effective to engage said drive mechanism and advance said frame.

2. A power operated device comprising a frame, a pair of handles at one end of the frame, a ground engaging wheel journalled in said frame, an engine carried by said frame for driving said ground engaging wheel, drive mechanism including a clutch for connecting the engine and the ground engaging wheel, and means pivotally connected to the frame between the engine and the handles in position to be moved by the operator's trunk to make said clutch mechanism operative to move said frame when the operator's trunk engages said pivotally connected means while he is holding said handles, and to render the drive mechanism inoperative to move the frame when the operator's trunk moves out of contact with said pivotally connected means.

3. The device of claim 2 in which the handles are rigid with the frame and the pivotally connected means includes a generally vertical bar having at its upper end a member to rest upon and be supported by the shoulder of the operator.

4. The device of claim 2 in which the pivotally connected means is resiliently held in clutch inoperative position and includes means to support the weight of the operator.

5. The device of claim 2 in which the handles are rigid with the frame and are spaced so as to provide room between the two handles for the operator, and the pivotally connected means consists of a member having a portion proximate the chest of the operator when so positioned, whereby when the operator leans forward in the normal position he would take when pulling the device forward, he will engage the pivotally connected means and cause the engine to drive the ground engaging wheel.

CHARLES L. STOKES.